United States Patent [19]

Park

[11] Patent Number: 5,349,482
[45] Date of Patent: Sep. 20, 1994

[54] CASSETTE LOADING DEVICE FOR USE WITH A VIDEO CASSETTE RECORDER

[75] Inventor: Jong S. Park, Seoul, Rep. of Korea
[73] Assignee: Daewoo Electronics Co., Ltd., Seoul, Rep. of Korea
[21] Appl. No.: 49,119
[22] Filed: Apr. 19, 1993
[30] Foreign Application Priority Data Apr. 21, 1992 [KR] Rep. of Korea ............ 92-6699

[51] Int. Cl.⁵ .................. G11B 15/675; G11B 5/008
[52] U.S. Cl. ........................... 360/96.5; 360/99.06
[58] Field of Search .............. 360/85, 93, 94, 96.5, 360/96.6, 99.02, 99.03, 99.06, 99.07; 369/75.1, 75.2, 77.1, 77.2; 242/198, 199

[56] References Cited

U.S. PATENT DOCUMENTS

| | | | |
|---|---|---|---|
| 4,831,472 | 5/1989 | Ando et al. | 360/96.5 |
| 4,866,551 | 9/1989 | Kishimoto et al. | 360/96.5 |
| 4,979,061 | 12/1990 | Kishimoto et al. | 360/96.5 |
| 5,036,413 | 7/1991 | Kishimoto | 360/96.5 |
| 5,055,953 | 10/1991 | Tsuchiya | 360/96.5 |
| 5,067,036 | 11/1991 | Ozawa | 360/96.5 |
| 5,235,480 | 8/1993 | Oh | 360/96.5 |

Primary Examiner—Stuart S. Levy
Assistant Examiner—Jefferson Evans
Attorney, Agent, or Firm—William F. Pinsak

[57] ABSTRACT

A photoelectric sensor is utilized for optically detecting the presence of a tape cassette in a loading commencement position to produce an electrical driving signal. Responsive to the driving signal, an electric loading motor is activated to cause a loading arm to swing from one angular position to another angular position. Rotary movement of the loading motor is translated into a pivotal swinging movement of the loading arm by a segmented linkage lever. The linkage lever carries a light beam interrupter piece which may cut off the light beam projected by the photoelectric sensor to enable the latter to generate the electrical driving signal. The linkage lever also carries an arm locking finger adapted to lock the loading arm in a loading completion position.

5 Claims, 2 Drawing Sheets

CASSETTE LOADING DEVICE FOR USE WITH A VIDEO CASSETTE RECORDER

FIELD OF THE INVENTION

The present invention relates to a cassette loading device for use with a video cassette recorder and, more particularly, to an improved tape cassette loading device which may carry out the cassette loading operation through the use of a reduced number of parts or components and which is able to lock a loading arm against any inadvertent displacement of the cassette out of its proper loading position.

DESCRIPTION OF THE PRIOR ART

A video cassette recorder, usually referred to as "VCR" by its acronym, includes a cassette loading device which is adapted to automatically transport a manually inserted tape cassette onto a reel table. Typically, the cassette loading device is provided with a cassette holder movable between a cassette reception position, a loading commencement position and a loading completion position. Placement of the tape cassette into the loading commencement position may be detected by a suitable sensor which, in turn, transmits a driving signal to an electric loading motor. In response, the electric motor is energized to bring the cassette holder together with the tape cassette into the loading completion position, thereby terminating a loading cycle of the tape cassette. Such a cassette loading process is distinguished from the so-called "tape loading" process which follows the cassette loading process.

One of the prior art cassette loading devices is disclosed in U.S. Pat. No. 4,752,048 issued to Myung C. Paik, which utilizes a reel motor as a power source to eliminate the need of a separate loading motor. The rotational force of the reel motor is selectively transmitted to a swingable loading arm through a belt-and-pulley combination so that the loading arm may rotate clockwise to cause a cassette holder to move toward a final loading position. A function plate is used to effect the selective transmission of the rotational force, in combination with a pivotable lever which is normally biased counterclockwise by a tension spring.

U.S. Pat. No. 4,628,382 to Y. Okumura discloses another prior art cassette loading device comprising a cassette holder for holding a cassette inserted through a cassette inlet, means for transporting the cassette from an insertion position to a completely loaded position by driving the cassette holder, and a reduction drive assembly for coupling the transportation means to a drive source. The reduction drive assembly includes a first drive mechanism having a small reduction ratio and engageable with the transportation means, when the cassette holder is located between the insertion position and the completely loaded position, and a second drive mechanism having a greater reduction ratio and engageable with the transportation means, when the cassette holder is brought to the completely loaded position or immediately therebefore.

While the prior art cassette loading devices referred to above are capable of performing their assigned task, needs have continued to exist for an improved cassette loading device which is more advantageous and desirable in terms of space requirements, manufacturing costs and operational reliability. More specifically, the known cassette loading devices have to employ a separate position sensor, e.g., a limit switch to detect the insertion of a tape cassette into the loading commencement position, which not only requires an additional space for the position sensor, but also increases the overall manufacturing cost of the video cassette recorder.

Further, a torsion spring or its equivalent is used in the conventional cassette loading devices to resiliently depress the cassette holder against a base plate of the video cassette recorder. Employing such a torsion spring is to, on one hand, counteract over-rotation of the loading motor beyond a predetermined angular extent and, on the other hand, to restrain any unwanted displacement of the cassette holder after the cassette loading operation has been completed. With this type of conventional cassette loading devices, if the loading motor under-rotates and, therefore, fails to reach the predetermined angular position, the torsion spring cannot resiliently depress the cassette holder against the base plate, thereby leaving the cassette holder -and the tape cassette quite unstable. On the other hand, if the loading motor over-rotates beyond the predetermined angular position, the loading arm and other components of the cassette loading devices are likely to be damaged, due to the severe stress exerted thereon by the loading motor.

SUMMARY OF THE INVENTION

It is therefore an object of the invention to provide a cassette loading device which requires no separate position sensor or limit switch in order to detect the insertion of a tape cassette into a loading commencement position and which is capable of reducing the number of components and the overall manufacturing costs of a video cassette recorder.

Another object of the invention is to provide a cassette loading device which can lock a loading arm against any pivotal movement at the end of a cassette loading operation to keep a cassette holder free from an inadvertent displacement and which can positively accommodate unwanted under-rotation or over-rotation of a loading motor.

In accordance with the invention, a photoelectric sensor that has been used for the purpose of detecting an end-run of a magnetic tape is utilized in detecting the presence of a tape cassette in the loading commencement position to feed an electric driving signal to an electric motor. The photoelectric sensor includes a light emitter which continually projects a light beam along a given path and a pair of light receivers which serve to receive the projected light beam. Responsive to the driving signal, the electric motor is activated to cause a loading arm to swing from one angular position to another angular position. Rotary movement of the electric motor is translated into a pivotal movement of the loading arm by means of a slidable linkage lever. The linkage lever" includes a first elongate segment operatively connected to the electric motor and a second elongate segment operatively connected to the loading arm. The second segment is extendibly coupled to the first segment in an end-to-end relationship therewith and normally biased toward the first segment by a tension spring. A light beam interrupter piece is carried by the second segment in such a way that, when the tape cassette is inserted into the loading commencement position, the light beam interrupter piece may cut off the projected light beam to enable the photoelectric sensor to generate the electrical driving signal.

Preferably, the second segment of the linkage lever has a generally flat upright post which extends vertically upward from the second segment to support the light beam interrupter piece at its free end. Immediately below the light beam interrupter piece, an arm locking finger extends from the flat upright post toward the loading arm in a substantially parallel relationship with respect to the second segment. As the cassette loading operation comes to an ,end, the arm locking finger is adapted to lock the loading arm against any pivotal movement.

BRIEF DESCRIPTION OF THE DRAWINGS

The above and other objects and features of the instant invention will become apparent from the following description of the preferred embodiments taken in conjunction with the accompanying drawings in which.

DETAILED DESCRIPTION OF THE PREFERRED EMBODIMENTS

Figure 1:
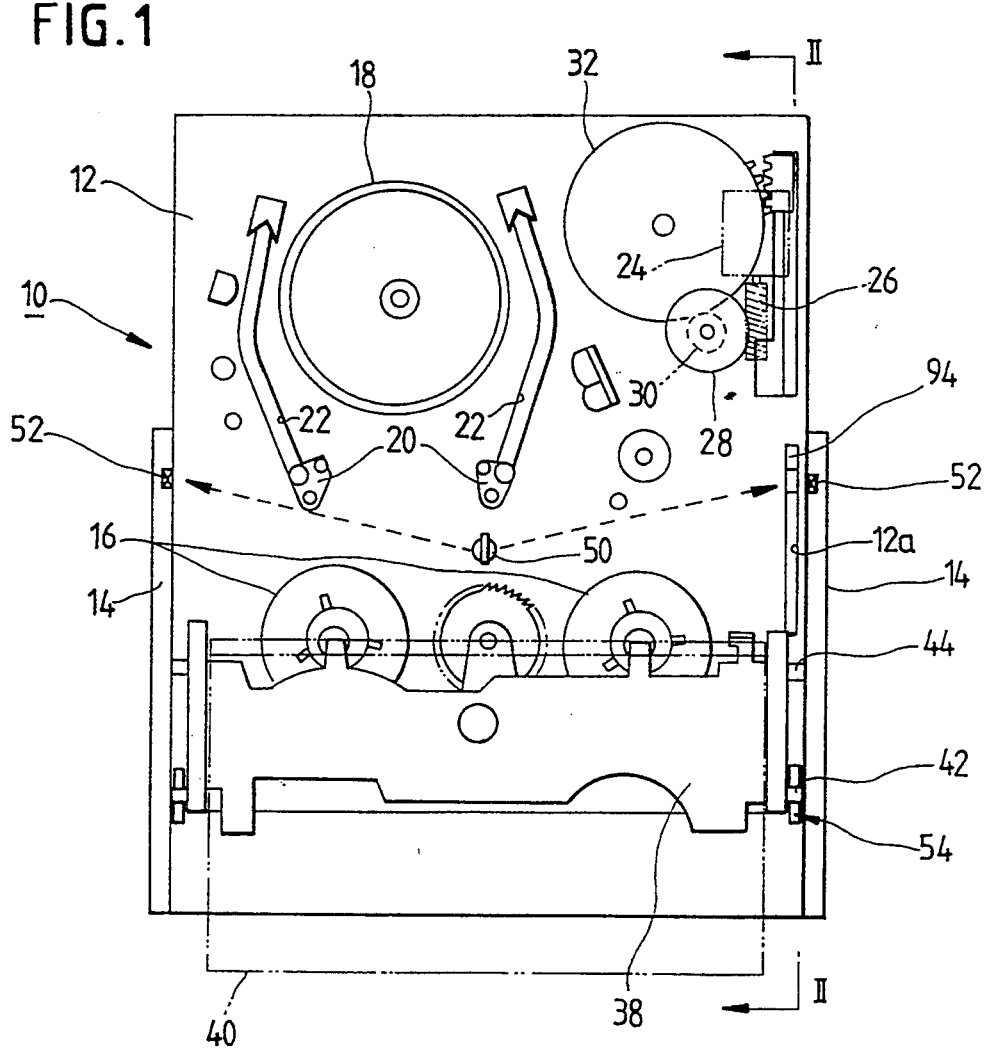
FIG. 1 is a schematic top view showing the deck or main chassis of the video cassette recorder incorporating the cassette loading device in accordance with the invention.
Figure 2:
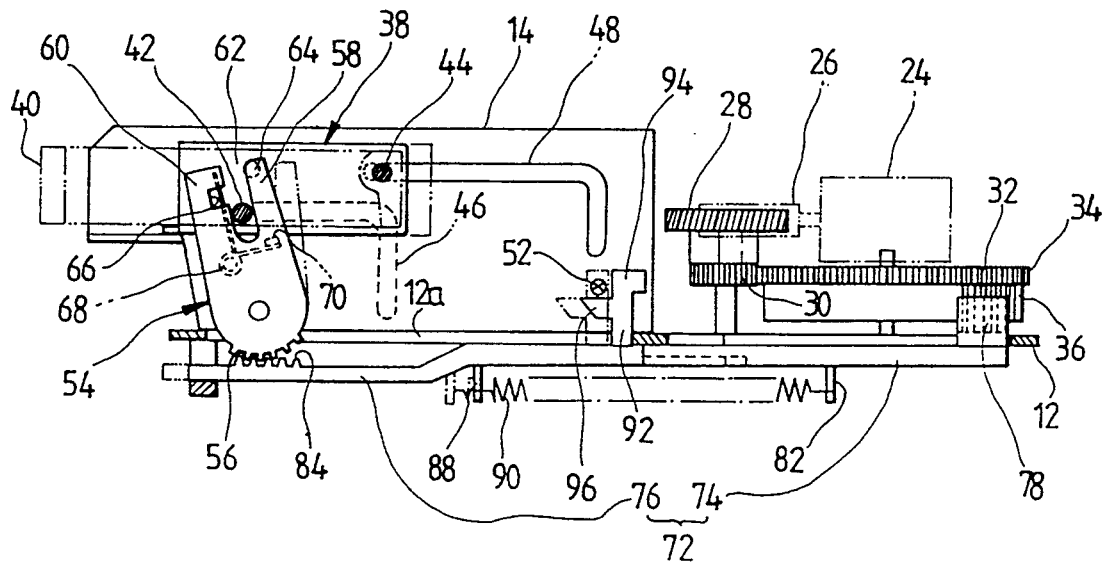
FIG. 2 is a side sectional view taken along line II—II of FIG. 1, with the movable cassette holder thereof lying in a cassette reception position to receive a manually inserted tape cassette.

Referring first to FIGS. 1 and 2, a front-loading type video cassette recorder is shown to have a main chassis or deck, generally designated by reference numeral 10, which carries thereon various functional parts of the video cassette recorder. As shown, the main chassis 10 includes a rectangular bottom plate 12 and a pair of spaced parallel side walls 14, each of which extends vertically upward from opposite lateral edges of the bottom plate 12 and runs along a limited length of the latter.

As schematically depicted in FIG. 1, a reel table 16 is provided on the bottom plate 12 so that it can rotate the supply reel or the take-up reel of a tape cassette in a varying mode of operations. Rotatably mounted on the bottom plate with an appropriate spacing from the reel table 16 is a head drum 18 that serves to record and reproduce video signals on and from a magnetic tape. It is known that the magnetic tape may be stretched out of the tape cassette and them wound around the head drum 18 by a pair of pole bases 20 which may slide along the corresponding curvilinear slots 22 formed through the thickness of the bottom plate 12. This is typically referred to as "tape loading", as opposed to the cassette loading in which the novel features of the present invention reside. The curvilinear slots 22 are arranged in a substantially symmetrical pattern about the head drum 18 form a mirror image with respect to each other.

As best illustrated by a double-dotted phantom line in FIG. 2, a loading motor 24 is affixed at the right-handed upper region of the bottom plate 12, which loading motor may be advantageously used, in the instant invention, to perform the cassette loading as well as the tape loading. The loading motor 24 is provided at its output shaft with a worm 26 which meshes with a worm wheel 28 to obtain a reduced rotational speed. The worm wheel 28 is rotatable about a stub axle 30 that carries a coaxial intermediate gear 30 at a suitable axial position below the worm wheel 28. Further, the intermediate gear 30 engages with a pinion or cam gear 32 of relatively large diameter to further reduce the rotational speed of the loading motor 24. It should be appreciated that the pinion 32 has an upper tooth array 34 extending over the full perimeter of the pinion 32 and a lower tooth array running over a limited angular extent, e.g., 20 degrees, of the perimeter of the pinion 32. While not shown in the drawings, the pinion 32 is further provided with sinuous camming grooves at its opposite major surfaces, each of which is operatively connected to the pole bases 20 or other moving parts of the video cassette recorder through a suitable linkage mechanism.

A cassette holder 38 is movably mounted between the side walls 14 for transporting the tape cassette 40 from a cassette reception position to a loading commencement position and, then, to a loading completion position. The cassette holder 38 has a first and a second slider pins 42 and 44 protruding horizontally from each lateral side thereof to fit into a first and a second guide slots 46 and 48, as clearly shown in FIG. 2. As used herein, the "cassette reception position" is intended to mean a position wherein the cassette holder 38 is kept at rest to receive the tape cassette 40 just inserted through a cassette insertion opening(not shown) of the video cassette recorder. The "loading commencement position" refers to a position wherein the cassette holder 38 begins to move toward the reel table 16 by the rotational force of the loading motor 24 so as to initiate automatic loading of the tape cassette 40. In a known video cassette recorder, the loading commencement position is spaced, e.g., 20 mm, from the cassette reception position. Manual pushing force is used to advance the cassette holder 38 from the cassette reception position to the loading commencement position. Furthermore, by the "loading completion position" it is meant a position wherein the automatic cassette loading comes to an end, with the result that the tape cassette 40 is placed on the reel table 16.

Referring back to FIG. 1, provided adjacent to the reel table 16 is a photoelectric sensor which includes a light emitter 50, e.g., light emitting diode, and a pair of light receivers 52, e.g., phototransistors. The light emitter 50 is located at a center of the bottom plate 12 to project a light beam along a light beam path as indicated by a broken line arrow. The light receivers 52 are respectively positioned at each of the opposite side walls 14 of the main chassis 10 in a symmetrical relation to one another to receive the light beam projected from the light emitter 50. As is highly conventional, the photoelectric sensor serves to stop the reel table 16 from further rotation at the time when the lengthwise end stretch of a magnetic tape is optically detected.

In accordance with the present invention, the photoelectric sensor is also used to determine whether the cassette holder 38 is pushed into the loading commencement position from the cassette reception position. In case where the cassette holder 38 is determined to be in the loading commencement position, the photoelectric sensor will generate an electrical driving signal which enables the loading motor 24 to rotate in a forward direction so that the cassette holder 38 may be caused to displace from the loading commencement position toward the loading completion position. Description will be made later in more detail on how to detect the cassette holder which has been pushed into the loading commencement position.

As clearly shown in FIG. 2, a swingable loading arm 54 is pivotably attached to at least one of the side walls 14 of the main chassis 10 for pivotal movement between a first angular position corresponding to the cassette reception position, a second angular position corresponding to the loading commencement position and a third angular position corresponding to the loading completion position. The loading arm 54 carries at its distal end the cassette holder 38 in a manner that the cassette holder 38 may be caused to move from the cassette reception position toward the loading completion position as the loading arm 54 is being subjected to the pivotal movement.

In the illustrated embodiment, the loading arm 54 has a sector-like tooth array 56 around its proximal end and a pair of parallelly extending legs 58 and 60 at its distal end, the legs defining therebetween a longitudinal slot 62 which is open at one end to receive the first slider pin 42 of the cassette holder 38. The leg 58 is provided with a pin-like projection 64 which extends from the free end of the leg 58 perpendicularly to the principal plane of the loading arm 54. In contrast, the leg 60 has a cutout 66 which is open toward the longitudinal slot 62. A suitable torsion spring 68 is held on one surface of the loading arm 54, which consists a horizontal extension retained by a protrusion 70 and a vertical extension running across the cutout 66 of the leg 60. As will be described below, the torsion spring 68 serves to resiliently urge the first slider pin 42 of the cassette holder 38 toward the bottom plate 12, only when the loading arm 54 is in the third angular position.

Figure 3:
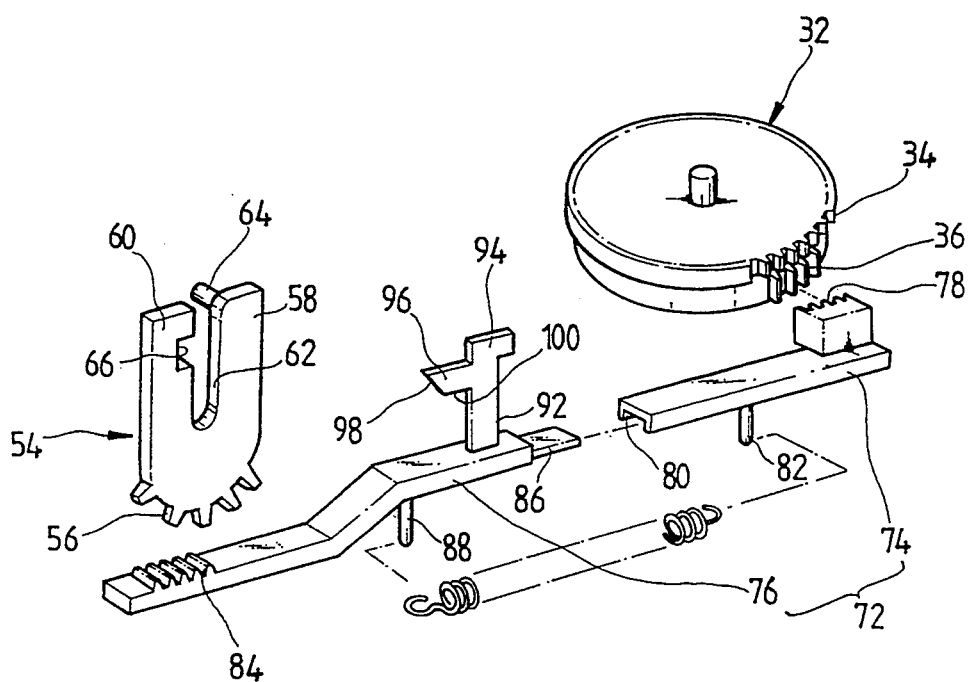
FIG. 3 is an exploded perspective view illustrating the segmented linkage lever that engages at one end with a pinion and at the other end with a swingable loading arm.

Referring to FIG. 2 and, particularly, to FIG. 3, there is shown a linkage lever 72 which is slidably mounted on the bottom plate 12 of the main chassis 10 for translating the rotary movement of the loading motor 24 into the pivotal swinging movement of the loading arm 54. The linkage lever 72 includes a first elongate segment 74 operatively connected to the loading motor 24 through the pinion 32 and a second elongate segment 76 operatively coupled to the cassette holder 38 through the loading arm 54. The first segment 74 has a rack 78, at one end thereof, which meshes with the lower tooth array 36 of the pinion 32 and, at the other end, a longitudinal groove 80 which extends along a limited length of the first segment 74. A boss 82 is protruding from the medial portion of the first segment 74 in a vertically downward direction.

The second elongate segment 76 of the linkage lever 72 has a rack 84, at one end thereof, which meshes with the sector-like tooth array 56 of the loading arm 54 and, at the other end, a tongue 86 which slidably engages with the longitudinal groove 80 of the first segment 74. In this way, the second segment 76 is extendibly coupled to the first segment 74 in an end-to-end relationship therewith. A boss 88 extends from the second segment 76 in a vertically downward direction to retain one end of a tension spring 90 in place. The other end of the tension spring 90 is retained by the boss 82 of the first segment 74, thereby ensuring that the second segment 76 be normally biased toward the first segment 74.

In addition, the second elongate segment 76 has a generally flat upright post 92 that extends upward from the second segment 76 itself through a lateral slot 12a of the bottom plate 12. The upright post 92 terminates at a light beam interrupter piece 94 which is so shaped and arranged that, when the cassette holder 38 is in the loading commencement position, it can interrupt the light beam projected from the light emitter 50 to thereby enable the photoelectric sensor to generate an electrical driving signal. While the light beam interrupter piece 94 is shown, by way of example, to have a generally rectangular configuration, the present invention is not limited thereto and, therefore, may employ an interrupter piece of different shape, whether circular or polygonal, as long as it can effectively interrupt or cut off the light beam at the loading commencement position.

Immediately below the light beam interrupter piece 94, an arm locking finger 96 extends from the upright post 92 toward the loading arm 54 in a substantially parallel relationship with respect to the second segment 76. As best shown in FIG. 3, the arm locking finger 96 has a slant camming surface 98 for depressing the loading arm 54 into a final locking position and a horizontal bearing surface 100 for keeping the loading arm immovable in the locked position. In an alternative embodiment, the camming surface 98 of the arm locking finger 96 may have a rounded or curved shape to ensure that smooth depressing action occur as the loading arm 54 is depressed into the locked position.

Operation of the inventive cassette loading device will now be described with reference to FIGS. 2, 4 and 5.

Under the rest or stand-by state illustrated in FIG. 2, the loading arm 54 lies in the first angular position with the cassette holder 38 in the cassette reception position, as depicted by a solid line. If the tape cassette 40 is inserted through a cassette insertion opening(not shown), the cassette holder 38 will receive it in a stable condition ready for transportation. Further pushing the tape cassette inwardly will cause the cassette holder 38 to move up to the loading commencement position, as depicted by a double-dotted phantom line in FIG. 2. Concurrently, the loading arm 54 is caused to swing toward the second angular position as shown by a double-dotted phantom line. In response, the second elongate segment 76 of the linkage lever 72 is pulled away from the first segment 74 against the elastic restoring force of the tension spring 90. At this moment, the first segment 74 remains stationary, due to the fact that the pinion 32 meshing with the first segment 74 is prevented from any reverse rotation by the cooperative action of the worm 26 and the worm wheel 28.

As the second segment 76 is being extended away from the first segment 74 in the manner stated above, the light beam interrupter piece 94 carried by the second segment 76 will be brought into a light beam blocking position as illustrated by a double-dotted phantom line in FIG. 2, thus interrupting the light beam projected from the light emitter 50. As a result, the light beam receiver 52 fails to receive the projected light beam, in which time the photoelectric sensor will generate an electrical driving signal. In response to the driving signal, the electric loading motor 24 begins to rotate in a forward direction, the rotational force of which is transmitted to the loading arm 54 through the worm wheel 28, the intermediate gear 30, the pinion 32 and the linkage lever 72 in the stated sequence. Accordingly, the loading aria 54 is caused to swing from the second angular position toward the third angular position as shown in FIG. 4. This enables the cassette holder 38 to move from the loading commencement position toward the loading completion position. In this way, the tape cassette 40 can be transported onto the reel table 16.

Figure 4:
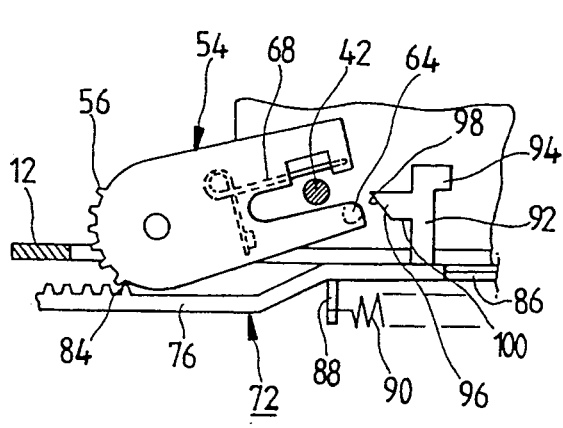
FIG. 4 shows the loading arm which has rotated clockwise to bring the cassette holder into a loading completion position.

As shown in FIG. 4, even after the loading arm 54 has reached the third angular position, the linkage lever 72 may continue to travel leftward unless and until the loading motor 24 ceases its forward rotation. Thus, the slant camming surface 98 of the arm locking finger 96 comes into contact with the pin-like projection 64 of the loading arm 54 to depress it toward the bottom plate 12 of the main chassis over a substantial period of time. This will allow for over-rotation or under-rotation of the loading motor 24 that may often occur at the end of cassette loading operation.

Figure 5:
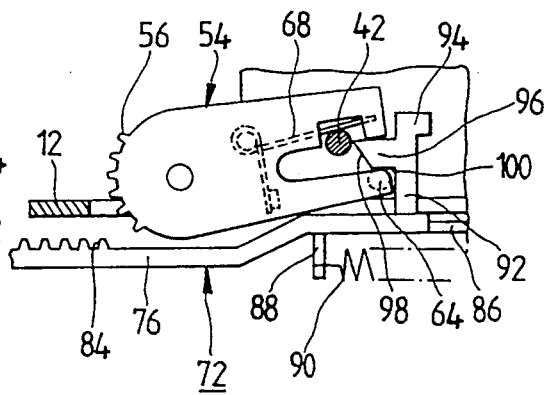
FIG. 5 is a view similar to FIG. 4 but showing the loading arm locked by the arm locking finger against any pivotal movement.

If the linkage lever further travels leftward from the position illustrated in FIG. 4, the loading arm D4 will rotate clockwise within a significantly limited angular extent by the depressing force of the arm locking finger 96, making the pin-like projection 64 locked under the horizontal bearing surface 100 of the arm locking finger 96, as clearly depicted in FIG. 5. With the loading arm 54 in the locked state, the first guide pin 42 of the cassette holder 38 is resiliently urged toward the bottom plate 12 by means of the torsion spring 68, which will keep the cassette holder 38 free from any inadvertent displacement out of the loading completion position. Once the cassette loading operation is completed as set forth above, the magnetic tape of the cassette will be stretched and then loaded around the head drum in the manner well-known in the art. It should also be appreciated that unloading of the tape cassette may be carried out in the reverse order of the foregoing cassette loading operation.

While the present invention has been shown and described with reference to the particular embodiments, it will be apparent to those skilled in the art that many changes and modifications may be made without departing from the spirit and scope of the invention as defined in the appended claims.

What is claimed is:

1. A cassette loading device for use with a video cassette recorder of the type including a main chassis composed of a generally rectangular bottom plate and a pair- of spaced parallel side walls each extending upward from lateral edges of the bottom plate, said device comprising:

a cassette holder movably mounted between the side walls for transporting a tape cassette from a cassette reception position to a loading commencement position and, then, to a loading completion position;

a photoelectric sensor including a light emitter located at a center of the bottom plate to project a light beam along a given light beam path and a pair of light receivers positioned at the side walls to receive the projected light beam, said photoelectric sensor designed to generate an electrical driving signal each time when the cassette holder is pushed into the loading commencement position;

a swingable loading arm pivotably attached at its proximal end to at least one of the side walls for pivotal movement between a first, a second and a third angular positions, the cassette holder being located at the cassette reception position, the loading commencement position, and the loading completion position respectively when the loading arm is located at said first, second, and third angular positions, said loading arm carrying the cassette holder at its distal end to allow the cassette holder to move between the loading commencement position and the loading completion position as it is being subjected to the pivotal movement;

an electric loading motor responsive to the electrical driving signal from the photoelectric sensor for causing the loading arm to swing from the second angular position to the third angular position so that the cassette holder can move from the loading commencement position to the loading completion position;

a linkage lever slidably mounted on the bottom plate for translating a rotary movement of the loading motor into a pivotal swinging movement of the loading arm, wherein said linkage lever including a first elongate segment operatively connected to the electric motor and a second elongate segment operatively connected to the loading arm, said second segment extendibly coupled to the first segment in an end-to-end relationship therewith and normally biased toward the first segment by a tension spring; and a light beam interrupter piece carried by the second segment, said interrupter piece so shaped and arranged that, when the cassette holder is in the loading commencement position, it can interrupt the light beam to thereby enable the photoelectric sensor to generate the electrical driving signal.

2. The cassette loading device as recited in claim 1, wherein said second segment of the linkage lever has a generally flat upright post extending upward therefrom and terminating at said light beam interrupter piece.

3. The cassette loading device as recited in claim 2, further comprising an arm locking finger extending from the flat upright post toward the loading arm in a substantially parallel relationship with respect to the second segment so that the arm locking finger can lock the loading arm against any pivotal movement at the third angular position.

4. The cassette loading device as recited in claim 3, wherein said arm locking finger has a slant camming surface for depressing the loading arm toward the bottom plate of the main chassis and a horizontal bearing surface for keeping the loading arm immovable in the third angular position.

5. The cassette loading device as recited in claim 4, further comprising a torsion spring mounted on the loading arm for resiliently urging the cassette holder against the bottom plate when the cassette holder is in the loading completion position.

* * * * *